US008650279B2

(12) United States Patent
Mehta et al.

(10) Patent No.: US 8,650,279 B2
(45) Date of Patent: Feb. 11, 2014

(54) MOBILE GATEWAY HAVING DECENTRALIZED CONTROL PLANE FOR ANCHORING SUBSCRIBER SESSIONS

(75) Inventors: Apurva Mehta, Cupertino, CA (US); Srinivasa Chaganti, San Ramon, CA (US); Gopi Krishna, Union City, CA (US); Krishna Sankaran, Milpitas, CA (US); Sanjiv Doshi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 154 days.

(21) Appl. No.: 13/172,556

(22) Filed: Jun. 29, 2011

(65) Prior Publication Data
US 2013/0007237 A1   Jan. 3, 2013

(51) Int. Cl.
*G06F 15/173* (2006.01)
(52) U.S. Cl.
USPC ........... 709/223; 709/224; 709/225; 709/226; 709/227; 709/228; 709/229
(58) Field of Classification Search
USPC .......... 709/223, 224, 225, 226, 227, 228, 229
See application file for complete search history.

(56) References Cited

U.S. PATENT DOCUMENTS

| 7,142,528 | B2 | 11/2006 | Tanimoto et al. |
| 7,369,522 | B1 | 5/2008 | Soininen et al. |
| 7,660,584 | B2 | 2/2010 | Maxwell et al. |
| 7,852,787 | B2 | 12/2010 | Gelbman et al. |
| 7,882,266 | B2 | 2/2011 | Xie et al. |
| 8,086,216 | B2 | 12/2011 | Feder et al. |
| 8,238,930 | B2 | 8/2012 | Awano |
| 8,255,540 | B2 | 8/2012 | Soininen et al. |
| 8,353,000 | B2 | 1/2013 | He et al. |
| 8,438,290 | B2 | 5/2013 | Rui et al. |
| 8,442,522 | B2 | 5/2013 | Pancorbo et al. |
| 8,446,899 | B2 | 5/2013 | Lei et al. |

(Continued)

FOREIGN PATENT DOCUMENTS

EP   2170000 A1   3/2010

OTHER PUBLICATIONS

3GPP TS 36.300, v10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2010, 183 pp.

(Continued)

*Primary Examiner* — Firmin Backer
*Assistant Examiner* — Jonathan Bui
(74) *Attorney, Agent, or Firm* — Shumaker & Sieffert, P.A.

(57) ABSTRACT

In general, techniques are described for decentralizing handling of subscriber sessions within a gateway device of a mobile network. A mobile network gateway comprises a data plane having a plurality of forwarding components to receive session requests from a mobile service provider network in which the mobile network gateway resides. A control plane comprises a plurality of distributed subscriber management service units coupled by a switch fabric to the data plane. Each of the subscriber management service units serve as anchors for communication sessions for mobile devices that are accessing one or more packet data network by the mobile service provider network. A request delegation module within each of the forwarding components directs the session requests to the subscriber management service units unit to provide management services for the sessions requested by the mobile device.

21 Claims, 6 Drawing Sheets

(56) References Cited

U.S. PATENT DOCUMENTS

| | | | |
|---|---|---|---|
| 8,462,728 B2 | 6/2013 | Stojanovski et al. | |
| 8,463,926 B2 | 6/2013 | Turanyi et al. | |
| 8,510,435 B2* | 8/2013 | Brunson et al. | 709/224 |
| 2004/0246933 A1* | 12/2004 | Valko et al. | 370/338 |
| 2008/0037483 A1* | 2/2008 | Ali et al. | 370/338 |
| 2008/0044181 A1 | 2/2008 | Sindhu | |
| 2008/0076412 A1 | 3/2008 | Khetawat et al. | |
| 2008/0254768 A1 | 10/2008 | Faccin | |
| 2009/0010271 A1 | 1/2009 | Bachmann et al. | |
| 2009/0207843 A1 | 8/2009 | Andreasen et al. | |
| 2010/0008319 A1* | 1/2010 | Awano | 370/329 |
| 2010/0091653 A1 | 4/2010 | Koodli et al. | |
| 2010/0177674 A1* | 7/2010 | Aggarwal | 370/312 |
| 2010/0177685 A1* | 7/2010 | Aggarwal | 370/328 |
| 2010/0177752 A1* | 7/2010 | Aggarwal et al. | 370/338 |
| 2010/0211628 A1* | 8/2010 | Shah | 709/203 |
| 2010/0215051 A1* | 8/2010 | Solis et al. | 370/408 |
| 2010/0246500 A1 | 9/2010 | Rydnell et al. | |
| 2010/0272031 A1 | 10/2010 | Grayson et al. | |
| 2010/0278116 A1* | 11/2010 | Hu et al. | 370/328 |
| 2010/0296443 A1* | 11/2010 | Hirano et al. | 370/328 |
| 2011/0013562 A1* | 1/2011 | Levkowetz | 370/328 |
| 2011/0105118 A1* | 5/2011 | Tinnakornsrisuphap et al. | 455/435.1 |
| 2011/0131338 A1 | 6/2011 | Hu | |
| 2011/0299395 A1 | 12/2011 | Mariblanca | |
| 2011/0317664 A1* | 12/2011 | Schlenk et al. | 370/331 |
| 2011/0319054 A1 | 12/2011 | Cutler et al. | |
| 2012/0069763 A1 | 3/2012 | Zhao et al. | |
| 2012/0082132 A1 | 4/2012 | Andreasen et al. | |
| 2012/0093167 A1 | 4/2012 | Velandy et al. | |
| 2012/0155442 A1* | 6/2012 | Haddad et al. | 370/338 |
| 2012/0188983 A1* | 7/2012 | Mihaly et al. | 370/331 |
| 2012/0198046 A1 | 8/2012 | Shah et al. | |
| 2012/0214492 A1* | 8/2012 | Mihaly et al. | 455/437 |
| 2012/0257566 A1* | 10/2012 | Le et al. | 370/328 |
| 2012/0297076 A1 | 11/2012 | Wu et al. | |

OTHER PUBLICATIONS

3GPP TS 23.401, v10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.

U.S. Appl. No. 12/182,619, by Jerome P. Moisand, filed Jul. 30, 2008.

U.S. Appl. No. 12/905,771, by Venkatesh Badakere Ramachandra, filed Oct. 15, 2010.

U.S. Appl. No. 13/172,505, by Andrzej Szyszko, filed Jun. 29, 2011.

U.S. Appl. No. 13/172,579, by Apurva Mehta, filed Jun. 29, 2011.

* cited by examiner

MOBILE GATEWAY HAVING DECENTRALIZED CONTROL PLANE FOR ANCHORING SUBSCRIBER SESSIONS

TECHNICAL FIELD

The invention relates to mobile networks and, more specifically, to session handling within mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile service provider network, or mobile network, includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs. The increasing number of services available to an increasing number of mobile subscriber devices pressures available mobile network resources.

SUMMARY

In general, techniques are described for decentralizing handling of subscriber sessions within a gateway device of a mobile network. For example, a mobile gateway device is described having an internal architecture that offloads subscriber session management from a centralized control node to a set of service units (e.g., subscriber management service cards). In this sense, the subscriber management service units provide a form of a decentralized control plane for managing subscriber communication sessions. As a result, the mobile gateway device may achieve increased scalability to handle thousands or millions of concurrent communication sessions from mobile devices.

As described, the mobile gateway device includes a forwarding plane having a plurality of forwarding units coupled by a high-speed switch fabric. Subscriber session requests received by the forwarding plane are dynamically load balanced among the individual subscriber management service units of the decentralized control plane for the mobile gateway device. The set of individual subscriber management service units of the mobile gateway device provide multiple possible anchor points for respective sessions contexts for each individual subscriber session managed by the mobile gateway device for a mobile network by which the corresponding subscriber device accesses packet-based data services.

In one example, forwarding units within the forwarding plane of a network device receive session requests initiated by subscriber devices and forwarded by downstream nodes within the mobile network. The decentralized subscriber management service units of the mobile gateway device present a uniform interface (e.g., a single IP address) to subscribers seeking access to services. Any forwarding unit that receives a session request for a new subscriber session selects one of the subscriber management service units to handle the session request according to a function applied uniformly by the forwarding units to session request keying information. The forwarding units direct the session requests to the selected service units for handling and session configuration. The techniques may therefore reduce or eliminate any need for a central entity in the control plane, such as a routing unit, to manage and distribute received session requests.

In some examples, the subscriber management service units receive the session requests forwarded from the forwarding plane and determine whether to operate as a control plane anchor point for the requested sessions or to dynamically redistribute the session requests to another one of the subscriber management service units based on current session load data shared among the service units. The techniques may therefore eliminate a requirement of a central entity to perform subscriber session load distribution on a per session request basis, thereby increasing a subscriber scalability.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
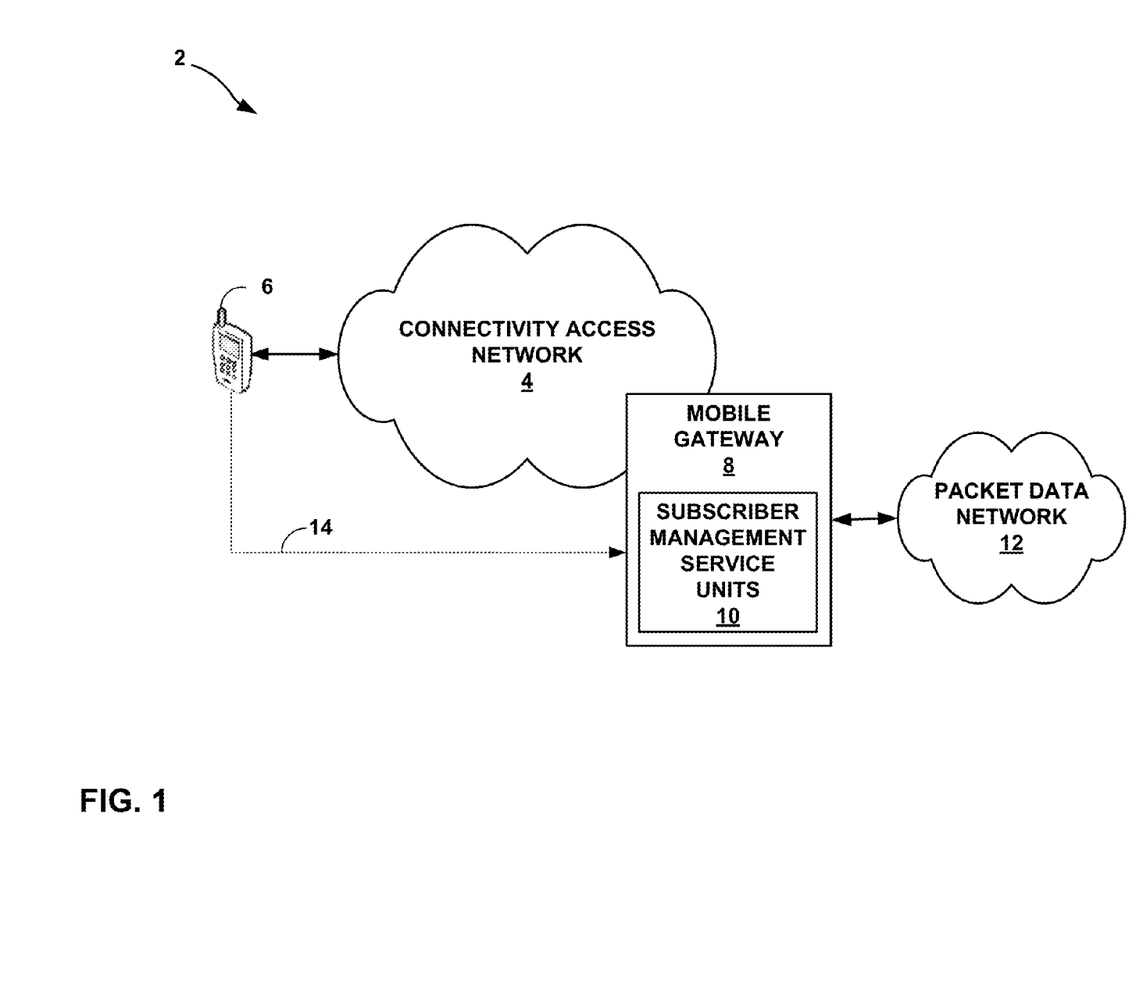
FIG. 1 is a block diagram illustrating an example mobile network in which a mobile gateway device distributes session requests and anchors sessions in a decentralized control plane according to the described techniques.

FIG. 1 is a block diagram illustrating an example network system 2 in which mobile gateway 8 includes a decentralized control plane for decentralized handling of subscriber session according to the described techniques. In this example, network system 2 comprises packet data network (PDN) 12 coupled to connectivity access network 4 ("CAN 4") via mobile gateway 8 of CAN 4. Packet data network 12 supports one or more packet-based services that are available for request and use by wireless device 6. As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates CAN 4, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Wireless device 6 is a wireless communication device that may comprise, for example, a mobile telephone, a laptop or desktop computer having, e.g., a 3G/4G wireless card, a wireless-capable netbook, a video game device, a pager, a smart phone, a personal data assistant (PDA), a utility meter, or a security device such as a motion detector or door lock. Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments, as User Equipment (UE) or Mobile Stations (MS).

A service provider operates CAN 4 to provide network access, data transport and other services to wireless device 6. In general, CAN 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GGP/2), an Internet Engineering Task Force (IETF) and a Worldwide Interoperability for Microwave Access (WiMAX) forum. For example, CAN 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Connectivity access network 4 may, alternatively or in conjunction with one of the above, implement a Code Division Multiple Access-2000 ("CDMA2000") or Enhanced Data Rates for GSM Evolution (EDGE) architecture. Connectivity access network 4 may, again as an alternative or in conjunction with one or more of the above, implement a WiMAX architecture defined by the WiMAX forum.

In some examples, connectivity access network 4 may comprise a core packet-switched network (not shown in FIG. 1) and one or more radio access networks (also not shown in FIG. 1). A core packet-switched network of CAN 4 may comprise, for example, a general packet radio service (GPRS) core packet-switched network, an IP-based mobile multimedia core network, or an Evolved Packet Core (EPC) or Evolved Packet System (EPS). The core packet-switched network of CAN 4 comprises intermediate devices required to implement the protocols of the particular architectural embodiment of CAN 4, such as Serving GPRS Serving Nodes (SGSNs) and Mobility Management Entities (MMES). Wireless device 6 communicates with CAN 4 using a wireless communication link to one of the radio access networks of the connectivity access network. Radio access networks of CAN 4 may include, for example, for example, a GSM Radio Access Network (GRAN), a WiMAX radio access network, a UMTS Radio Access Network (UTRAN), and/or an evolution of a UTRAN known as an E-UTRAN. Connectivity access network 4 may further include a backhaul or transport network (not shown) that includes land-based transmission lines, frequently leased by a service provider for the connectivity access network, to transport user and control traffic between wireless device 6 and mobile gateway 8. The backhaul network also includes network devices such as aggregation devices and routers. Further details of an example connectivity access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

In the example of FIG. 1, mobile gateway 8 is a network device that operates as a gateway to PDN 12 and may comprise, for example, a Gateway GPRS Serving Node (GGSN), an Access Gateway (aGW), or a Packet Gateway (P-GW). Mobile gateway 8 may present a uniform interface to downstream nodes, such as SGSNs and MMEs, to allow the downstream nodes to send session requests to the uniform interface rather than separately directing session requests among multiple devices or multiple control plane entities (e.g., service cards) within a single device. In some instances, the uniform interface is an IP address or other network layer address of mobile gateway 8 that is shared among all control plane entities, including subscriber management service units 10. In addition, any one of subscriber management service units 10 may anchor a session for any service (identified, for instance, by an Access Point Name (APN)) for which mobile gateway 8 operates as a gateway.

In some implementations, mobile gateway 8 may be a router that executes routing protocols to identify routes through CAN 4 or PDN 12 to various destinations. While described herein with respect to one or more particular architectures for ease of illustration purposes, CAN 4 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Mobile gateway 8 and other elements of connectivity access network 4 may, therefore, each represent an abstraction of devices found within any type of mobile network architectures.

Connectivity access network 4 establishes and operates bearers to transport user traffic, in the form of PDP packet data units (PDUs), referred to hereinafter as "packets." In general, a bearer is a set of network resources and data transport functions in CAN 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

To attach to CAN 4, wireless device 6 initiates an attach request by issuing session request 14 toward CAN 4. Session request 14 includes a mobile device identity that identifies wireless device 6 to mobile gateway 8. The wireless device identity may represent, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a subscriber username, an MSISDN number (e.g., a "Mobile Subscriber Integrated Services Digital Network Number") or other data identifying wireless device 6. In this way, mobile gateway 8 received a wireless device identity for wireless device 6 in session request 14.

While illustrated as a single message from wireless device 6 to mobile gateway 8, session request 14 may represent a plurality of messages that traverse intermediate network devices of CAN 4 to identify wireless device 6 to mobile gateway 8. For example, in an LTE architecture, session request 14 may represent an initial Attach Request message issued by wireless device 6 to an eNode B, which forwards the request to an MME. The MME may incorporate information received in the Attach Request message, including the wireless device identity, into a first Create Session Request message that the MME then sends to an SGSN and that is also represented by session request 14. The SGSN generates a second Create Session Request message that incorporates information received by the SGSN in the first Create Session Request, such as the wireless device identity. The second Create Session Request message, which is sent by the SGSN to a GGSN represented by mobile gateway 8, is also represented by session request 14. As another example, session request 14 may represent an Activate PDP Context Request message from wireless device 6 to an SGSN and a Create PDP Context Request message from the SGSN to mobile gateway 8. Other mobile network architectures may have similar messaging schemes to identify wireless device 6 to mobile gateway 8 as part of an attach procedure or other procedure to establish a requested session. In addition, the initial Attach Request or Active PDP Context Request message may be responsive to a request by mobile gateway 8 to wireless device 6 to initiate a session with mobile gateway 8.

Connectivity access network 4 delivers session request 14 to mobile gateway 8, which includes a plurality of subscriber management service units 10 that establish a CAN session using the described techniques and a default bearer to carry user traffic for the wireless device. In general, the CAN session is an association between CAN 4 and wireless device 6 that is identifiable by a combination of a wireless device 6 PDP address and an Access Point Name (APN) for a service provided by PDN 12. That is, the CAN session (hereinafter, "subscriber session" or "session") is a service-specific (as specified by the APN) session for a service provided to wireless device 6. Besides establishing a default bearer, the attach procedure may trigger establishment, by CAN 4, of one or more dedicated bearers between mobile gateway 8 and wireless device 6 to carry user traffic. In an IP-based connectivity access network 4, a session comprises an IP-CAN session.

In accordance with the described techniques, each of subscriber management service units 10 is associated with different values for wireless devices identities within the wireless device identity space. This association may be as a result of a formula/function or an allocation of ranges or individual values of the wireless device identity space among the service units, for example. Mobile gateway 8 receives session request 14 and distributes the session request to one of subscriber management service units 10 based on the wireless device identity carried by the session request. That is, mobile gateway 8 selects an associated one of subscriber management service units 10 for session request 14 and sends the session request to the selected subscriber management service unit for handling. The selected one of subscriber management service units 10 receives session request 14 and establishes a session for wireless device 6 to communicate with PDN 12. Thereafter, the selected service unit anchors the newly established session by handling all control traffic for the session and maintaining session data for the session. Performing decentralized session request handling in this manner may enable mobile gateway 8 to scale a number of subscriber sessions by adding additional subscriber management service units 10.

In some instances, subscriber management service units 10 exchange respective session load data with one another to dynamically distribute current session loads among the service units. Session load data provides an indication of a number of subscriber sessions currently being anchored by each of subscriber management service units 10. In these instances, the selected one of subscriber management service units 10 receives session request 14 and determines, based on its current session load and the session loads of the other service units, whether to anchor the session for the session request or to offload the session request to another one of subscriber management service units 10 that is currently handling fewer sessions. If the selected one of subscriber management service units 10 elects to anchor the session being requested in session request 14, the selected service unit establishes and anchors the session as described above. If, however, the selected one of subscriber management service units 10 that receives service request 14 determines another one of the service unit is to anchor the corresponding service session, the selected service unit forwards service request 14 to the anchoring service unit, which either establishes and anchors the session as described above or forwards the service request to another one of the subscriber management service units. The techniques may therefore eliminate a requirement of a central entity to perform subscriber session load distribution on a per session request basis, thereby increasing a subscriber scalability within a single network device, mobile gateway 8, that presents a uniform interface to subscribers seeking access to PDN 12 services.

Figure 2:
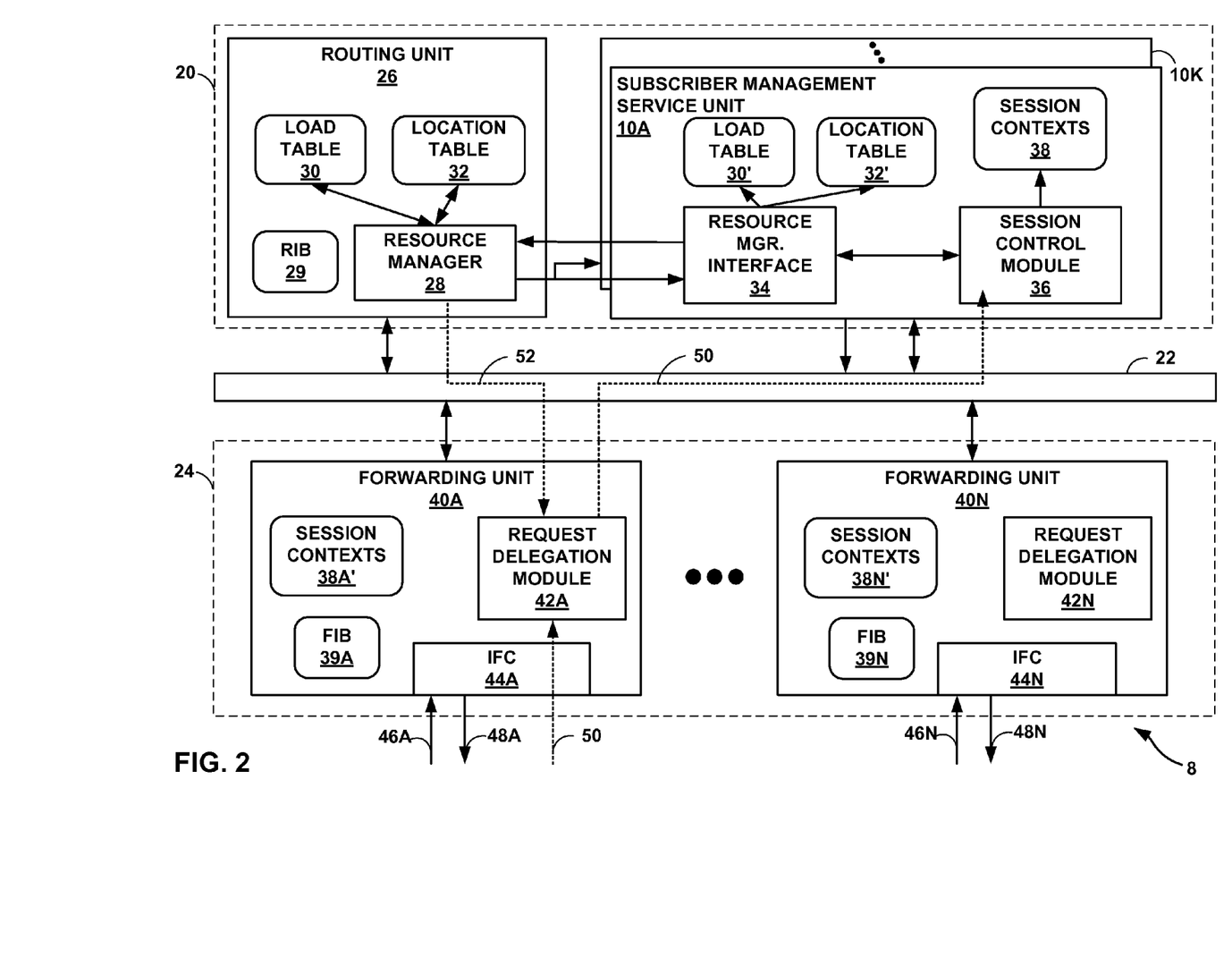
FIG. 2 is a block diagram illustrating, in further detail, an example instance of the gateway of FIG. 1 that performs decentralized session request delegation and handling according to techniques described herein.

FIG. 2 is a block diagram illustrating, in further detail, an example embodiment of mobile gateway 8 of FIG. 1 that performs decentralized session request delegation and handling according to techniques described herein. In this example, mobile gateway 8 is divided into two logical or physical "planes" to include a first control plane 20 and a second "data" or "forwarding" plane 24. That is, mobile gateway 8 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 20 is a decentralized control plane in that control plane functionality is distributed among routing unit 26 and a plurality of subscriber management service units 10A-10K ("subscriber management service units 10"). Similarly, data plane 24 in this example is a decentralized data plane in that data plane functionality and packet forwarding functionality is distributed among a plurality of forwarding units 40A-40N ("forwarding units 40"). Each of routing unit 26, subscriber management service units 10, and forwarding units 40 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 26, subscriber management service units 10, and forwarding units 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 22 couples routing unit 26, subscriber management service units 10, and forwarding units 40 to deliver data units and control messages among the units. Switch 22 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 26 executes the routing functionality of mobile gateway 8. In this respect, routing unit 26 represents hardware or a combination of hardware and software of control that implements routing protocols (not shown in FIG. 2) by which routing information stored in a routing information base 29 ("RIB 29") may be determined. RIB 29 may include information defining a topology of a network, such as CAN 4 of FIG. 1. Routing unit 26 may resolve the topology defined by routing information in RIB 29 to select or determine one or more routes through the network. Routing unit 20 may then update data plane 24 with these routes, where forwarding units 40 of data plane 24 store these routes as respective forwarding information bases 39A-39N ("FIBs 39"). Further details of one example embodiment of a router can be found in U.S. patent application Ser. No. 12/182,619, filed July 30, entitled "STREAMLINED PACKET FORWARDING USING DYNAMIC FILTERS FOR ROUTING AND SECURITY IN A SHARED FORWARDING PLANE," which is incorporated herein by reference.

In addition, routing unit 26 includes resource manager 28 operating as a process or "daemon" to receive static or dynamic resource-related information for mobile gateway 8 and publish the information to subscriber management service units 10 and forwarding units 40 to facilitate techniques of this disclosure. For example, resource manager 28 may be statically configured, by an administrator or other entity using a management interface, with information describing subscriber management service units 10 such as the number of service units as well as respective capacities of the individual service units (e.g., the number of sessions that the service unit is able to anchor). Resource manager 28 may download statically or dynamically updated resource-related information for subscriber management service units 10 to forwarding units 40. In the illustrated example, resource manager 28 sends the number of subscriber management service units 10 of mobile gateway 8 to request delegation module 42A within message 52. As described in further detail below, resource manager 28 may also receive resource-related information from subscriber management service units 10 that describes respective dynamic session loads being currently anchored by the service units.

Data plane (alternatively, "forwarding plane") 24 represents hardware or a combination of hardware and software that forward network traffic in accordance with forwarding information. In the example of mobile gateway 8 of FIG. 2, data plane 24 includes forwarding units 40 that provide high-speed forwarding of network traffic received by interface cards 44A-44N ("IFCs 44") via inbound links 46A-46N to outbound links 48A-48N. Forwarding units 40 may each comprise one or more packet forwarding engine ("PFE") coupled to respective interface cards 44 and may represent, for example, a dense port concentrator (DPC), modular port concentrator (MPC), flexible physical interface card (PIC) concentrator (FPC), or another line card, for example, that is insertable within a mobile gateway 8 chassis or combination of chassis.

Each of forwarding units 40 may include substantially similar components to perform substantially similar functionality, said components and functionality being described hereinafter with respect to forwarding unit 40A. Forwarding unit 40A includes a request delegation module 42A that receives session requests via IFC card 44A and delegates the session requests to a selected one of subscriber management service units 10 according to an association between the respective wireless identifiers or another property of the session requests and the selected service unit 10 for the session request. As described in further detail below, the association may be a result of a hash or other function performed on session request field values by request delegation module 42A. Because each of forwarding units 40 may delegate session requests in this manner, the techniques may enable mobile gateway 8 to avoid centralized delegating within routing unit 26 or a single one of subscriber management service units 10. This may prevent a bottleneck in session request handling inherent to centralized delegation and allow mobile gateway 8 to respond more quickly to session requests, thereby increasing the ability of mobile gateway 8 to manage sessions in the highly fluid environment of mobile connectivity. Moreover, this may allow mobile gateway 8 to more easily be expanded to include computing resources necessary to handle increased volume of subscriber sessions.

In the illustrated example, IFC card 44A receives session request 50 on inbound interface 46A and forwards the session request to request delegation module 42A. Upon receiving session request 50, request delegation module 42A selects associated service unit 10A to handle the session request and forwards session request 50 to service unit 10A. Request delegation module 42A may process the session request to remove GTP and other headers. Session request 50 may represent an example of session request 14 of FIG. 1 and may include, for instance, a Create Session Request message transmitted by a Serving Gateway (S-GW) to mobile gateway 8 operating as a PGW of an EPC of an LTE network or a Create PDP Context Request transmitted by an SGSN to mobile gateway 8 operating as a GGSN of a GPRS packet-switched network. Session request 50 includes a wireless device identifier (e.g., an IMSI) and may further include an Access Point Name that identifies a packet data network and may in some instances further identify a requested service (e.g., Internet, WAP, or multimedia messaging service (MMS)) provided by the packet data network. In other words, the APN is a logical name that determines the appropriate gateway (e.g., GGSN) for the wireless device and by a gateway to determine the services requested by the user or the address of an access point in an external packet network to which user packets from the wireless device should be forwarded.

Subscriber management service units 10 of control plane 20 present a uniform interface to subscriber devices and provide decentralized service session setup and management for mobile gateway 8. For example, all of subscriber management service units 10 may be addressable by the same IP or other PDP address, and control messages destined for the same IP or other PDP address of subscriber management service units 10 may therefore be handled by any of the service units. Internally, each of subscriber management service units 10 may include a unique identifier that identifies the service unit to other components of mobile gateway 8. Subscriber management service units 10 identifiers may include, for example, an index, identifying string, internal IP address, or link layer address. Subscriber management service units 10 may each represent, for example, a packet forwarding engine (PFE) or a component of physical interface card insertable within a chassis of mobile gateway 8. The physical interface card may be, for instance, a multi-services dense port concentrator (MS-DPC). Subscriber management service units 10 may also each represent a co-processor executing on a routing node, such as routing unit 26. Subscriber management service units 10 may be alternatively referred to as "service PICs" or "service cards." Each of subscriber management service units 10 includes substantially similar components to perform substantially similar functionality, said components and functionality being described hereinafter with respect to service unit 10A.

Session control module 36 of service unit 10A establishes sessions requested by a connectivity access network in which mobile gateway 8 is located and manages the sessions once established. Session control module 36 stores session data, received in control plane protocol messages received by session control module 36 or allocated by session control module 36, for one or more sessions managed by service unit 10A in session contexts 38. Service unit 10A may be referred to as the anchoring service unit for sessions stored in session contexts 38 in that service unit 10A stores control and forwarding information needed to manage the sessions. Each of subscriber management service units 10 includes an instance of session control module 36 and may therefore independently execute control plane protocols required to establish a session for a subscriber. In this sense, the subscriber management service units 10 provide a form of a decentralized control plane for managing subscriber communication sessions. As a result, the mobile gateway 8 may achieve increased scalability to handle thousands or millions of concurrent communication sessions from mobile devices. A session context stored in session contexts 38 for a session in which a wireless device participates may include, for example, the PDP address allocated by the CAN for the wireless device for use in sending and receiving user packets, routing information used by service unit 10A in forwarding user packets such as tunnel endpoint identifiers (TEIDs) and identifiers/addresses for downstream nodes, the APN for the session, and quality of service (QoS) profiles.

As control plane anchors for subscriber sessions, service units 10 handle configuration of forwarding units 40 for constructing subscriber-specific forwarding paths for processing and forwarding data traffic from the mobile devices. For example, service unit 10A may program session contexts 38 to forwarding units 40 for storage in respective session contexts 38A'-38N' ("session contexts 38'"). Forwarding unit 40A, for instance, receives user packets, maps the user packets to a session context in session contexts 38', and apply forwarding constructs to forward the user packets according to the session context data. For example, forwarding of downstream user packets by forwarding unit 40A for a particular session may include encapsulating the user packets using the GPRS Tunneling Protocol (GTP) and setting the specified downstream TEID for the session within a GTP header. Example details on subscriber management units 60 constructing subscriber-specific forwarding paths within forwarding units 68 can be found in U.S. patent application Ser. No. 13/172505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Session control module 36 receives session requests from forwarding units 40 and handles the session requests by redistributing the session requests to another one of subscriber management service units 10 or by setting up the requested session. Location table 32' and load table 30' populated locally by session control module 36 and remotely by resource manager 28 of routing unit 26 via resource manager interface 34 (illustrated as "resource mgr. interface 34") of service unit 10A include session-related information that determine whether session control module 36 is to redistribute new session requests. Resource manager 28 is a centralized management entity that synchronizes session load and session location data among subscriber management service units 10. In some examples of mobile gateway 8, however, subscriber management service units 10 directly synchronize such session-related data to one another in lieu of a centralized management entity.

In particular, location table 32' is an associative data structure that includes one or more entries that map unique identifiers for respective sessions to the one of subscriber management service units 10 managing the session. Each entry of location table 32' may map a combination of wireless device identity and APN for a session to an identifier for the one of subscriber management service units 10 that manages the session. When session control module 36 determines to manage a requested session, the session control module notifies resource manager interface 34, which notifies resource manager 28 of routing unit 26 that service unit 10A is to manage the requested session. Resource manager 28 updates master location table 32 within routing unit 26 and additionally synchronizes master location table 32 with respective local location tables 32' of each of subscriber management service units 10. In this way, resource manager 28 notifies each of subscriber management service units 10 that service unit 10A, for example, is to handle the requested session.

Load table 30' is an associative data structure that includes one or more entries that each store session load information for one of subscriber management service units 10. Entries of load table 30' may express session load information for a service unit as a percentage or ratio of session utilization, a number of sessions unallocated/available for managing by the service unit, or as another value that represents a session load of the described service unit. Resource manager interface 34 notifies resource manager 28 of changes to the session load of service unit 10A, as when service unit 10A creates or terminates a session in session contexts 38. Resource manager 28, in turn, updates master load table 30 with the session load of service unit 10A and additionally synchronizes master load table 30 with respective local load table 30' of each of subscriber management service units 10. In this way, resource manager 28 notifies each of subscriber management service units 10 of the session load of service unit 10A.

In the illustrated example, session control module 36 receives and handles session request 50 forwarded by forwarding unit 40A. As described in further detail below, session control module 36 accesses load table 30' and location table 32' to determine whether to manage the requested session. If session control module 36 determines that another one of subscriber management service units 10 is to manage the requested session, the session control module forwards session request 50 to the determined service unit. In this way, each of subscriber management service units 10 may redistribute session requests to implement decentralized load balancing techniques without the participation of a centralized entity to delegate each of the session requests. The techniques may, as a result, facilitate subscriber scalability correlative to a number of subscriber management service units 10.

Figure 3:
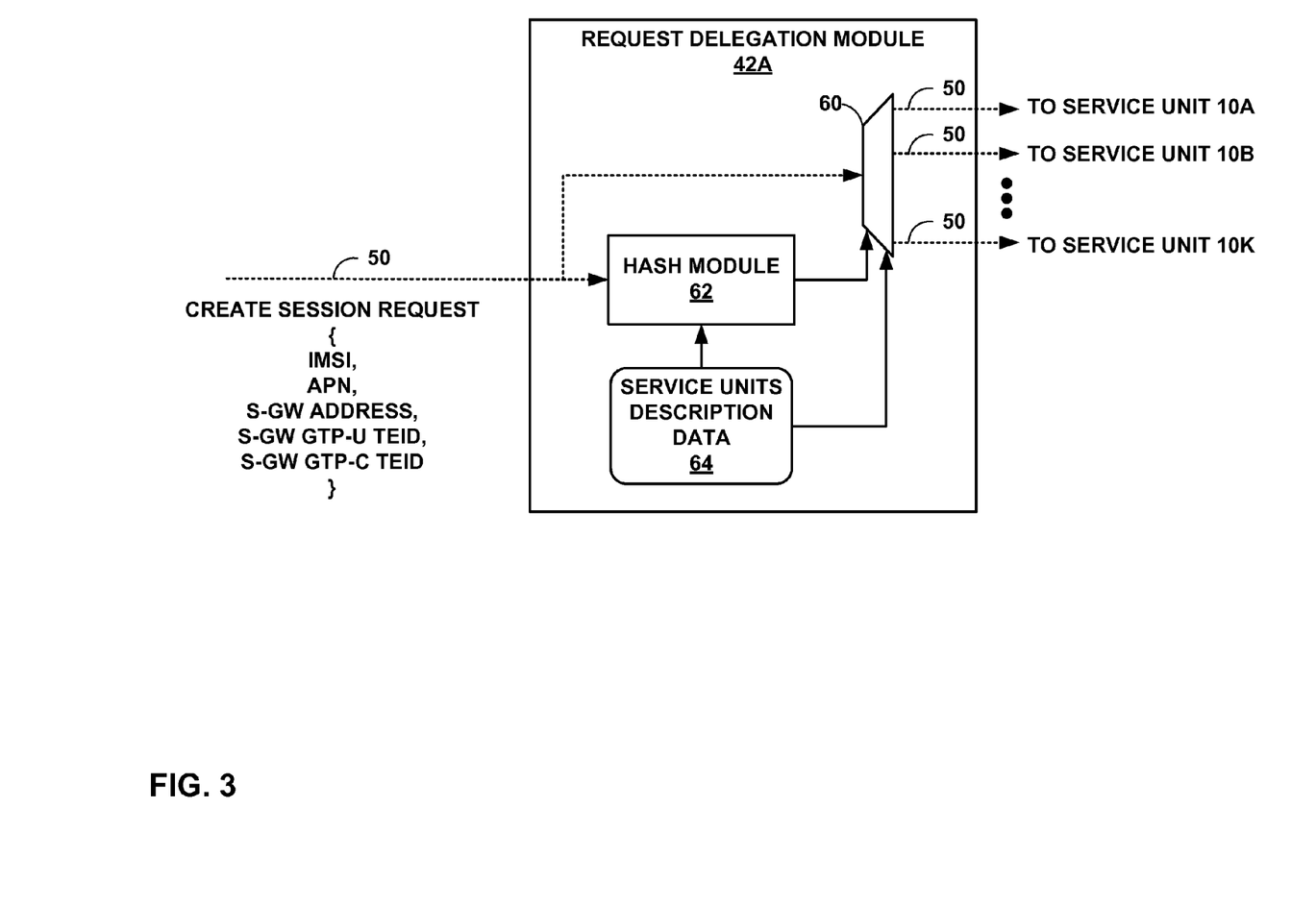
FIG. 3 is a block diagram illustrating a request delegation module of a forwarding unit that assigns session requests among a number of service units of a gateway in accordance with the techniques of this disclosure.

FIG. 3 is a block diagram illustrating, in detail, an example instance of request delegation module 42A of forwarding unit 40A of FIG. 2. Request delegation module 42A receives session request 50, which in this instance is illustrated as a Create Session Request message for an LTE network and includes IMSI, APN, S-GW address, S-GW GTP-U(ser plane) TEID, and S-GW GTP-C(ontrol plane) values for the message. Hash module 62 receives session request 50 and selects a handling service unit by associating the session request with one of subscriber management service units 10. In this example, said association is a result of a hash function applied by hash module 62 to identifying information for the requested session as specified by session request 50. Again, in this example, hash module 62 applies the hash function, which may be SHA-1 or MD5 executed by a hash engine for instance, to a combination of the IMSI and APN specified by session request 50 to select the handling one of subscriber management service units 10 for the session request. In various other examples, hash module 62 may apply the hash function to other identifying information, such as the aforementioned IMSI, APN, S-GW address, S-GW GTP-U TEID, S-GW GTP-C, a sequence number of the session request that differentiates subsequent requests for the same service from a single subscriber, or any combination thereof.

Service units description data 64 includes identifiers for subscriber management service units 10 and specifies the number of subscriber management service units 10 of mobile gateway 8 available to handle session request 50. Service units description data 64 may in some examples represent forwarding structures that specify respective next hops to subscriber management service units 10. The number of subscriber management service units 10 modifies the hash function applied by hash module 62 to vary the number of hash buckets into which session request 50 may be placed, where each hash bucket for the hash function corresponds to one of subscriber management service units 10. That is, hash module 62 applies the hash function to produce a hash value and, based on the hash value, place session request 50 into one of a number of hash buckets that each corresponds to one of service units 50, thereby selecting the corresponding service unit for the hash bucket. In some instances, hash module 62 may apply modulo division to the hash value to identify an index to and thereby select a service unit. In this way, hash module 62 implements a hash table or hash map that maps session request 50 keys to one of subscriber management service units 10. Hash module 62 directs multiplexer 60 to direct session request 50 to the one of service units selected by hash module 62. Multiplexer 60 may access service units description data 64 to retrieve an identifier for the selected service unit 10 to forward session request 50 toward the selected service unit.

Figure 4:
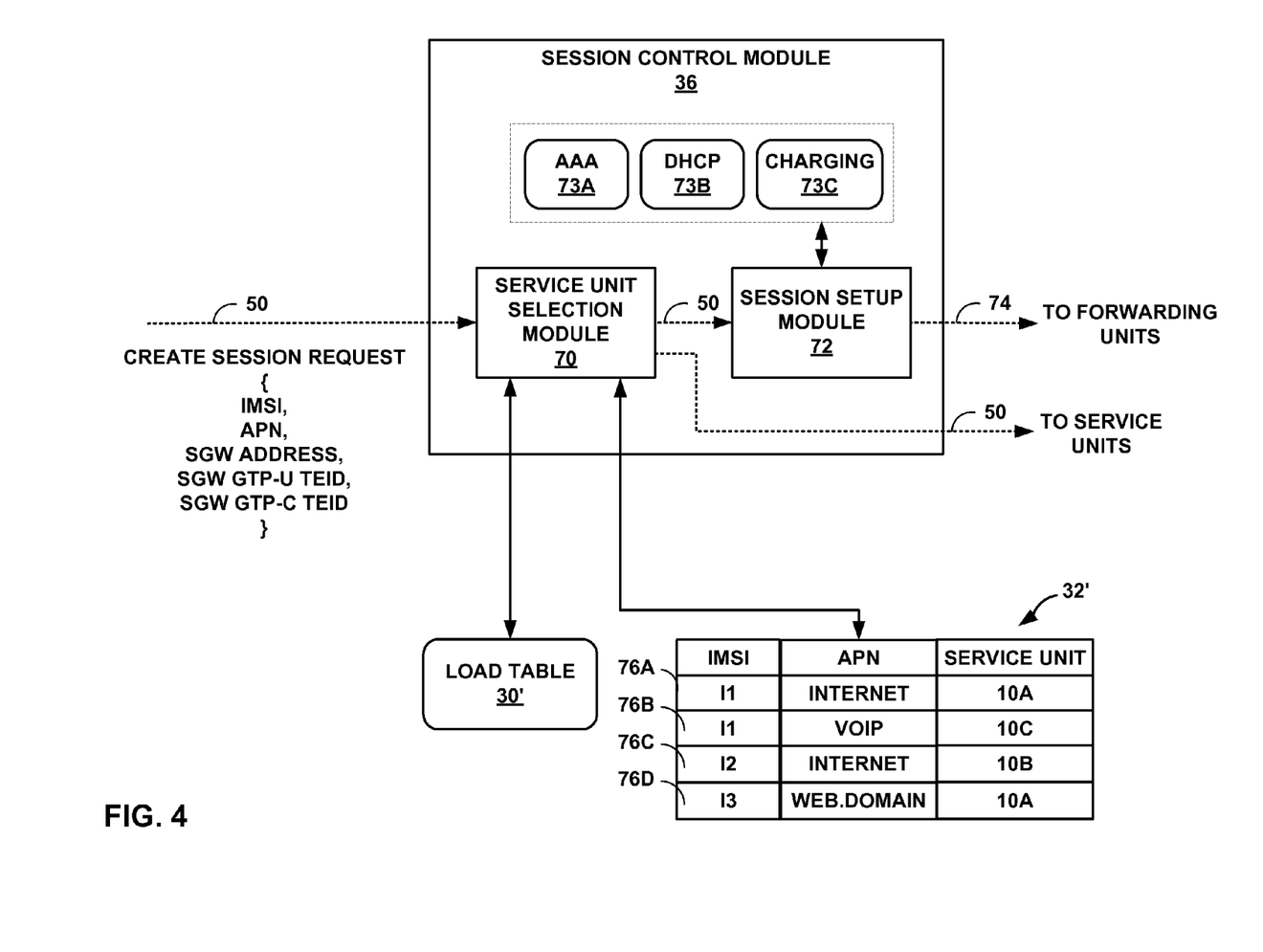
FIG. 4 is a block diagram illustrating, in detail, example components of a service unit that operate to perform decentralized session request handling according to techniques described in this disclosure.

FIG. 4 is a block diagram illustrating, in detail, example components of service unit 10A that operate to perform decentralized control plane management of subscriber sessions. Location table 32' of service unit 10A includes location table entries 76A-76D ("location table entries 76") that each maps a unique identifier for a session to an identifier for one of subscriber management service units 10. More specifically, location table entries 76 in this instance map a combination of IMSI and APN for a session to an identifier for one of subscriber management service units 10. Each of location table entries may therefore map a single IMSI to multiple different subscriber management service units 10. For example, location table entry 76A, 76B both specify IMSI "I1" but location table entry 76A specifies APN value "Internet" and is managed by service unit 10A, while location table entry 76B specifies APN value "VoIP" and is managed by service unit 10C. In this way, subscriber management service units 10 implementing a decentralized control plane may manage multiple sessions for a single subscriber with multiple different service units.

Service unit selection module 70 of session control module 36 receives session request 50 forwarded by forwarding unit 40A to service unit 10A. As in the example illustrated in FIG. 3, session request 50 is a Create Session Request message for an LTE network and includes IMSI, APN, S-GW address, S-GW GTP-U TEID, and S-GW GTP-C values. Service unit selection module 70 accesses location table 32' using the IMSI and APN of session request 50 to identify a matching one of location table entries 76. If the matching location table entry specifies service unit 10A (i.e., the service unit that includes session control module 36), service unit 10A is already managing the requested session and service unit selection module 70 therefore passes session request 50 to session setup module 72 for handling. If the matching one of location table entries 76 specifies another one of subscriber management service units 10, service unit selection module 70 forwards session request 50 to the specified service unit. This eventuality may occur where a downstream node (e.g., an S-GW) fails and therefore is unable to continue serving the session and also fails to direct mobile gateway 8 to delete the original session context for the session. The subscriber may reinitiate the session with a subsequent session request. If the number of available subscriber management service units 10 has changed in the interim, forwarding units 40 may assign the subsequent session request 50 to service unit 10A rather than the service unit that anchors the session established responsive to the earlier session request. As a result, the anchoring service unit may coordinate the subsequent session request 50 vis-à-vis the original session context, typically by deleting the original session context. In this way, service unit selection module 70 ensures that the same service unit selected to anchor the earlier session request is selected to anchor the retransmitted session request in order to avoid duplicating a session context for a session, which would result in a duplicated PDP address for the subscriber session.

If none of location table entries 76 matches the ISMI and APN of session request 50, service unit selection module 70 identifies one of subscriber management service units 10 to manage the requested session. Service unit selection module 70 accesses load table 30' to determine whether service unit 10A has session capacity to manage the requested session and, if so, forwards session request 50 to session setup module 72. If service unit 10A is congested, however, service unit selection module 70 selects from load table 30' an uncongested one of subscriber management service units 10 to manage session request 50 and forwards the session request to the selected service unit. In addition, service unit selection module 70 creates a new entry in location table 32' to map the IMSI and APN of session request 50 to the service unit selected to manage the session request, whether service unit 10A or another one of subscriber management service units 10. As described above, resource manager interface 34 of service unit 10A in cooperation with resource manager 28 of routing unit 26 synchronizes location table 32' among subscriber management service units 10. Service unit selection module 70 also increments an entry for load table 30'

Session setup module 72 is a stateful session protocol module that exchanges control messages with downstream nodes of the connectivity access network and with network servers to establish requested sessions being managed by service unit 10A. In the illustrated example, session setup module 72 executes various control protocols 73A-73C in addition to GTP to obtain subscriber-specific information for a session. In particular, session setup module 72 executes an authentication, authorization, and accounting (AAA) protocol 73A, a dynamic host configuration protocol (DHCP) 73B, and a charging protocol 73C for communication, for example, with a policy charging rules function (PCRF) entity. As a result, each of subscriber management service units 10 may independently operate to execute control protocols 73 and establish sessions. Session setup module 72 may receive session request 50 and exchange control messages with downstream nodes of the connectivity access network to establish the requested session and store resulting information for the session in session contexts 38. Responsive to session request 50, session setup module 72 issues a session request response 74 that is forwarded by forwarded units 40 to the destination downstream node of the connectivity access network.

Figure 5:
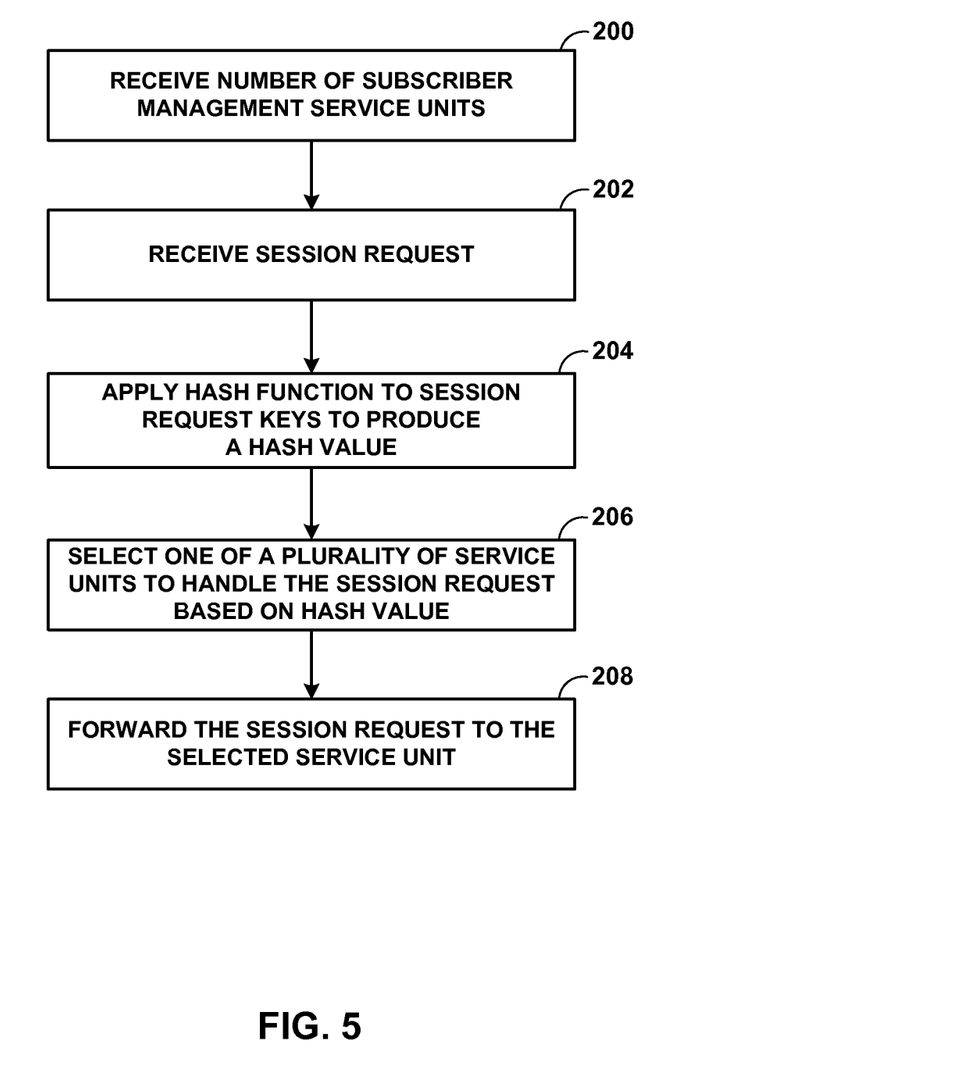
FIG. 5 is a flow chart illustrating an example mode of operation of the request delegation module of FIG. 3 to assign a session request to one of a number of service units according to decentralized delegation techniques described in this disclosure.

FIG. 5 is a flow chart illustrating an example mode of operation of request delegation module 42A of FIG. 3 to assign a session request to one of subscriber management service units 10 according to decentralized delegation techniques described in this disclosure. Request delegation module 42A receives the number of service units available to handle session requests from a management entity and stores this data to service units description data 64 (200). Request delegation module 62 then receives a session request (202) and directs hash module 62 to perform a hash function on the session request keys (e.g., IMSI+APN) (204). Hash module 62 uses the value of the hash function to select one of subscriber management service units 10 based on the number of service units (206) and directs multiplexer 60 to forward the received session request to the selected service unit (208).

Figure 6:
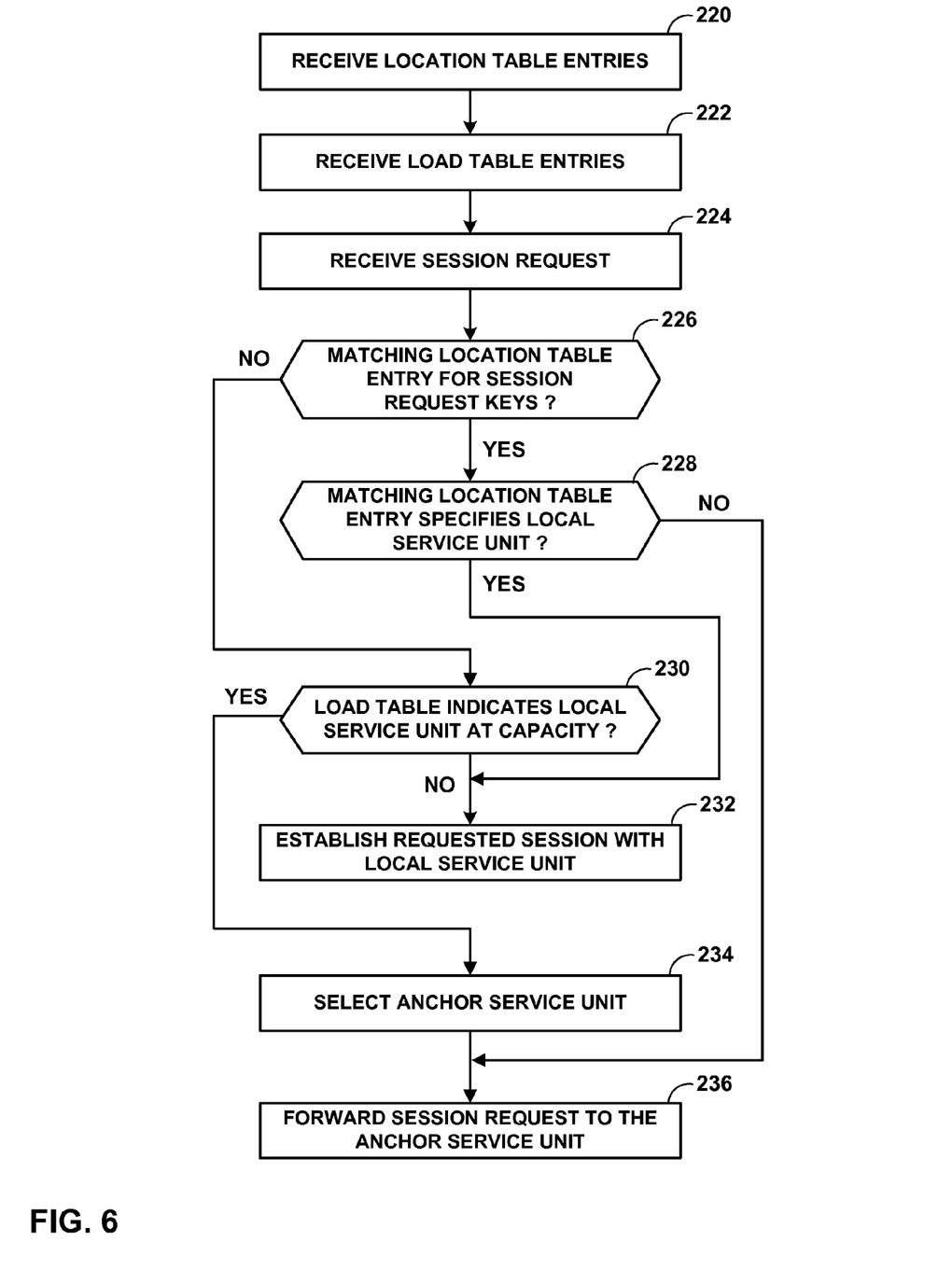
FIG. 6 is a flow chart illustrating an example mode of operation of the example service unit to handle a session request in accordance with decentralized load balancing techniques described herein.

FIG. 6 is a flow chart illustrating an example mode of operation of the example service unit 10A of FIG. 2, including the example session control module 36 of FIG. 4, to handle a session request in accordance with decentralized load balancing techniques described herein. Resource manager interface 34 receives, from resource manager 28 of routing unit 28 or directly from other subscriber management service units 10, and installs entries for location table 32' that each map session request key information to the anchoring one of subscriber management service units 10 for a corresponding session (220). In addition, resource manager interface 34 receives, from resource manager 28 of routing unit 28 or directly from other subscriber management service units 10, and installs entries for load table 30' that each describe a session load upon a corresponding one of subscriber management service units 10 (222).

Service unit selection module 70 receives a session request forwarded by one of forwarding units 40 that selected service unit 10A to handle the session request (224). Service unit selection module 70 keys session request keys (e.g., IMSI+APN) to location table 32' to identify a matching location table entry (226). If location table 32' includes a matching location table entry (YES branch of 226), service unit selection module 70 further determines whether the matching location table entry specifies the local service unit (i.e., service unit 10A) as anchoring the corresponding session in the control plane (228). If the local service unit is specified (YES branch of 228), service unit selection module 70 forwards session request 50 to session setup module 72, which exchanges control plane messages with downstream nodes to establish the requested session (232). Session setup module 72 may retransmit a previous session request response or delete an existing session corresponding to the session request keys in order to facilitate establishing the requested session with service unit 10A. If a remote service unit (i.e., another one of subscriber management service units 10) is specified by the matching location table entry (NO branch of 228), service unit selection module 70 forwards the session request to the specified service unit that is already anchoring, or in the process of setting itself up to anchor, a session corresponding to the session request (236).

If no matching location table entry is present in location table 32', service unit selection module 70 accesses load table 30' to determine whether the local service unit (i.e., service unit 10A) is at capacity for anchoring sessions (230). If the local service unit is able to anchor additional sessions (NO branch of 230), service unit selection module 70 offloads the session request to session setup module 72, which exchanges control plane messages with downstream nodes to establish the requested session (232). If, however, the local service unit is at capacity and therefore unable to anchor additional sessions (YES branch of 230), service unit selection module 70 accesses load table 30' to select another one of subscriber management service units 10 that is not at capacity to anchor the session for the session request (234). Service unit selection module 70 may select the most lightly loaded of subscriber management service units 10. After selecting an anchor service unit, service unit selection module 70 forwards the session request to the selected service unit (236).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method of managing subscriber sessions with a mobile gateway device, the method comprising:
   receiving a session request with one of a plurality of forwarding units within a mobile network gateway device of a mobile service provider network that provides access to services of one or more packet data networks, wherein the session request identifies a mobile device and requests the mobile network gateway device to serve as an anchor for a subscriber session for the mobile device when accessing one of the packet data networks;
   selecting, with the forwarding unit, a first one of a plurality of subscriber management service units within the mobile network gateway device in response to the session request, wherein the plurality of subscriber management service units present a uniform interface to nodes within the mobile service provider network, and wherein the plurality of subscriber management service units serve as anchors for subscriber sessions for mobile devices when accessing one or more packet data networks by the mobile service provider network; and
   internally sending the session request from the forwarding unit to the first subscriber management service unit to provide management services for the subscriber session requested by the mobile device.

2. The method of claim 1, further comprising:
   establishing the subscriber session corresponding to the session request for the mobile device with the first subscriber management service unit to anchor the subscriber session; and
   sending a message from the first subscriber management service unit to the other subscriber management service units within the mobile network gateway device to indicate that the first subscriber management service unit anchors the subscriber session corresponding to the session request.

3. The method of claim 2, wherein establishing the subscriber session comprises programming one of the forwarding units with the first subscriber management service unit to install a subscriber specific forwarding path within the forwarding unit for processing and forwarding data traffic from the mobile device.

4. The method of claim 2, wherein establishing the subscriber session comprises providing services with the first subscriber management service unit necessary for managing the subscriber session from the mobile device including authentication, authorization, and accounting (AAA) and fee charging for the subscriber.

5. The method of claim 1, wherein the session request includes a mobile device identity, the method further comprising:
   selecting the first subscriber management service unit based at least on the mobile device identity.

6. The method of claim 5, further comprising:
   applying a hash function to the mobile device identity with the forwarding unit to produce a hash value; and
   mapping the hash value to one of the number of subscriber management service units with the forwarding unit to select one of the plurality of subscriber management service units.

7. The method of claim 1, further comprising:
   receiving the session request with the first one of a plurality of subscriber management service units;
   accessing a location table of the first subscriber management service unit having one or more location table entries that each specify an anchoring one of the subscriber management service units for a subscriber session to determine whether the location table includes a matching location table entry for a subscriber session corresponding to the session request; and
   upon determining the location table includes a matching location table entry that specifies an anchoring service unit that is not the first subscriber management service unit, redirecting the session request from the first subscriber management service unit to the anchoring service unit specified by the matching location table entry.

8. The method of claim 7, further comprising:
   matching session request keys to location table entry keys to determine the matching location table entry, wherein the session request keys include a mobile device identity.

9. The method of claim 7, further comprising:
   upon determining the location table includes a matching location table entry that specifies an anchoring service unit that is the first subscriber management service unit, deleting a session context for the subscriber session; and
   exchanging control messages with downstream nodes of the mobile service provider network to establish a new subscriber session responsive to the session request.

10. The method of claim 1, further comprising:
  determining, with the first subscriber management service unit, a session load for the first subscriber management service unit; and
  sending the session request to a second one of the subscriber management service units when the session load for the first subscriber management service unit is at a session capacity for the first subscriber management service unit.

11. The method of claim 10, further comprising:
  accessing a load table of the first subscriber management service unit to determine the session load for the second service unit is less than a session capacity for the second service unit.

12. The method of claim 10, further comprising:
  establishing the subscriber session corresponding to the session request with the first subscriber management service unit when the session load for the first subscriber management service unit is less than the session capacity.

13. The method of claim 10, further comprising:
  sending a message from the first subscriber management service unit to the other subscriber management service units to communicate the session load of the first subscriber management service unit.

14. A mobile network gateway device comprising:
  a data plane having a plurality of forwarding units to receive session requests from a mobile service provider network in which the mobile network gateway resides; and
  a control plane comprising a plurality of distributed subscriber management service units coupled by a switch fabric to the data plane, wherein the subscriber management service units serve as anchors for subscriber sessions for mobile devices when accessing one or more packet data networks by the mobile service provider network; and
  a request delegation module within each of the forwarding units to internally direct, by the switch fabric, the session requests to the subscriber management service units unit to provide management services for the sessions requested by the mobile device,
  wherein a forwarding unit of the plurality of forwarding units receives a session request of the session requests, wherein the session request identifies a mobile device of the mobile devices and requests the mobile network gateway device to serve as an anchor for a subscriber session for the mobile device when accessing the one or more packet data networks,
  wherein the request delegation module within the forwarding unit that received the session request selects a subscriber management service unit of the subscriber management service units to provide management services for the subscriber session requested by the mobile device and internally directs the session request to the selected subscriber management service unit.

15. The mobile network gateway device of claim 14, wherein each of the plurality of subscriber management service units includes a session control module to establish the subscriber sessions by programming the forwarding units to install subscriber specific forwarding paths within the forwarding units for processing and forwarding data traffic from the mobile devices.

16. The mobile network gateway device of claim 15, wherein the session control modules of the subscriber management service units exchange messages to indicate the subscriber sessions anchored by each of the subscriber management service units.

17. The mobile network gateway device of claim 15, wherein each of the session control modules of the subscriber management service units provides services that are necessary for managing the sessions from the mobile device including authentication, authorization, and accounting (AAA) and fee charging for the subscribers.

18. The mobile network gateway device of claim 14, wherein the request delegation module of each of the forwarding units components applies a hash function to mobile device identities within each of the session requests to produce hash values and maps the hash values to the subscriber management service units.

19. The mobile network gateway device of claim 14, wherein each of the subscriber management service units comprise:
  a location table having one or more location table entries that each specify an anchoring one of the subscriber management service units for each of the subscriber sessions; and
  a service unit selection module that accesses the location table in response to each session request to determine whether the location table includes a matching location table entry for a session corresponding to the session request and, upon determining the location table includes a matching location table entry that specifies an anchoring service unit that is not the first subscriber management service unit, redirect the session request from the first subscriber management service unit to the anchoring service unit specified by the matching location table entry.

20. A non-transitory computer-readable medium comprising instructions for causing one or more programmable processors to:
  receive a session request with one of a plurality of forwarding units within a mobile network gateway device of a mobile service provider network that provides access to services of one or more packet data networks, wherein the session request identifies a mobile device and requests the mobile network gateway device to serve as an anchor for a subscriber session for the mobile device when accessing one of the packet data networks;
  select, with the forwarding unit, a first one of a plurality of subscriber management service units within the mobile network gateway device in response to the session request, wherein the plurality of subscriber management service units present a uniform interface to nodes within the mobile service provider network, and wherein the plurality of subscriber management service units serve as anchors for subscriber sessions for mobile devices when accessing one or more packet data networks by the mobile service provider network; and
  internally send the session request from the forwarding unit to the first subscriber management service unit to provide management services for the subscriber session requested by the mobile device.

21. The method of claim 1, wherein the uniform interface comprises an Internet Protocol address shared among the plurality of subscriber management service units.

* * * * *